US 7,490,896 B2

(12) United States Patent
Smith

(10) Patent No.: US 7,490,896 B2
(45) Date of Patent: Feb. 17, 2009

(54) STOWABLE COMPONENT FOR A VEHICLE AND A METHOD FOR STOWING A VEHICULAR COMPONENT

(75) Inventor: Rodger G. Smith, Ludlow (GB)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/733,532

(22) Filed: Apr. 10, 2007

(65) Prior Publication Data

US 2008/0252121 A1 Oct. 16, 2008

(51) Int. Cl.
*A47C 15/00* (2006.01)
*A47C 7/62* (2006.01)

(52) U.S. Cl. .................. 297/235; 297/236; 297/188.04; 297/188.1

(58) Field of Classification Search ............ 297/188.08, 297/188.09, 188.1, 378.1, 234, 235, 236, 297/240, 146, 188.04
See application file for complete search history.

(56) References Cited

U.S. PATENT DOCUMENTS 4,726,621 A * 2/1988 Muller ....................... 297/146
5,492,389 A 2/1996 McClintock et al.
6,378,941 B1 * 4/2002 Opfer et al. .................. 297/257
6,811,200 B2 * 11/2004 Shibata et al. ................ 296/64
6,843,526 B2 1/2005 Honda et al.
7,077,474 B2 * 7/2006 Satani ......................... 297/236

FOREIGN PATENT DOCUMENTS

JP 2002-347488 12/2002
WO WO 03/057525 A1 7/2003

* cited by examiner

*Primary Examiner*—Milton Nelson, Jr.
(74) *Attorney, Agent, or Firm*—Brooks Kushman P.C.

(57) ABSTRACT

The present invention relates to a stowable seat assembly and a method for stowing a vehicular component. In at least one embodiment, the assembly and the vehicular component comprise a stowable seat assembly secured to the vehicle. Having a first seat back and a first seat base, which is adjacent to a longitudinal bar defining in part an opening and a cavity. The assembly also has adjacent to the first seat, a second seat having a second seat base with a bottom side and a second seat back foldable adjacent to the second seat base, and a pivot arm with a first end connected to the second seat base. A second end of the pivot arm is connected to the longitudinal bar, and is positionable on the bar allowing the folded second seat, to pass by the first seat back when pivoted laterally into the opening during stowing of the second seat.

26 Claims, 3 Drawing Sheets

STOWABLE COMPONENT FOR A VEHICLE AND A METHOD FOR STOWING A VEHICULAR COMPONENT

BACKGROUND OF THE INVENTION

1. Field of the Invention

The invention relates to a stowable component in a vehicle and a method for stowing a vehicular component.

2. Background Art

Vehicles are used for a number of purposes. As a consequence, the management of passenger seating and flow between seats in the vehicle is important. The ease and speed with which adaptation of the seating arrangements can be accomplished is a desirable feature. Often, the configurations impose undesirable compromises for users. For example, when passenger seats are put into a second row of a vehicle, the passengers often prefer to have amenities such as a beverage tray or a seat for another person adjacent to the other passenger seats. However, the adjacent amenities tray or adjacent seat often prevents passage between the second row seats to a third row of seats or a cargo space of the vehicle.

What is needed is a convenient way to reconfigure passenger seating when amenities trays and/or adjacent seats are used so that passengers can move relatively easily between a second row to a third row set of seats. The reconfiguration needs to be easy to accomplish and maximize space utilization within the vehicle compartment.

SUMMARY OF THE INVENTION

In at least one embodiment, the present invention relates to a stowable seat assembly for a vehicle that has a first seat secured to the vehicle. In this embodiment, the first seat has a first seat back and a movable first seat base with the first seat base overlying and adjacent to a longitudinal bar which defines at least in part an opening and a cavity underlying the first seat base. The assembly also has a second seat adjacent to the first seat. The second seat has a second seat base with a bottom side and a movable second seat back capable of being folded adjacent to the seat base. In at least this embodiment, the assembly also has a pivot arm with a first end which is connected to the bottom side of the second seat base, and a second end of the pivot arm which is connected to the longitudinal bar of the first seat. In at least this embodiment, the pivot arm is adapted to be positionable on the longitudinal bar allowing the second seat, when folded, to pass by the first seat back when pivoted laterally upward and into the opening during stowing of the second seat.

In another embodiment of the invention the stowable seat assembly for a vehicle has a first seat secured to the vehicle. In this embodiment, the first seat has a bar defining a portion of a periphery of an opening underlying the first seat. In this embodiment, a pivot arm has a first end and a second end with the first end connected to the first bar. In at least this embodiment, there is also a second seat having a seat base connected to the second end of the pivot arm and having a seat back connected to the seat base. The seat back includes a rotational back frame adapted to fold down adjacent to the seat base. The second seat when folded from a deployed position into an intermediate position is movable coaxially along the first bar until the second seat can rotate about the first bar through the opening into a stowed position.

In yet another embodiment of this invention is a method for stowing a vehicular component cooperable for stowing with an outer seat having a movable seat cushion in the second row of seats of a vehicle. The method includes rotating the movable seat cushion of the outer seat to expose an opening underlying a portion of the movable seat cushion. The opening is adapted to receive the vehicular component. The next step in this embodiment is sliding the vehicular component in a first direction along a longitudinal bar of the subframe of the outer seat until the vehicular component is capable of passing by a seat back of the outer seat when the vehicular component is pivoted laterally to the longitudinal bar. The next step in this embodiment is pivoting the vehicular component up and into the outer seat and being at or below a height level of the longitudinal bar when the pivoting is complete. The next step of this embodiment is rotating the movable cushion backwards toward the rear of the vehicle until the outer seat achieves a closed position and the vehicular component is stowed.

DETAILED DESCRIPTION OF THE PREFERRED EMBODIMENT(S)

Reference will now be made in detail to compositions, embodiments and methods of the present invention known to the inventors, however it should be understood that the disclosed embodiments are merely exemplary of the present invention which may be embodied in various alternative forms. Therefore, specific details disclosed herein are not to be interpreted as limiting, rather merely as a representative basis for teaching one skilled in the art to variously employ the present invention.

Except where expressly indicated, all numerical quantities in this description indicating the amounts of material or conditions of use are to be understood as modified by the word "about" in describing the broadest scope of the present invention. Practice within the numerical limits stated is generally preferred.

Figure 1:
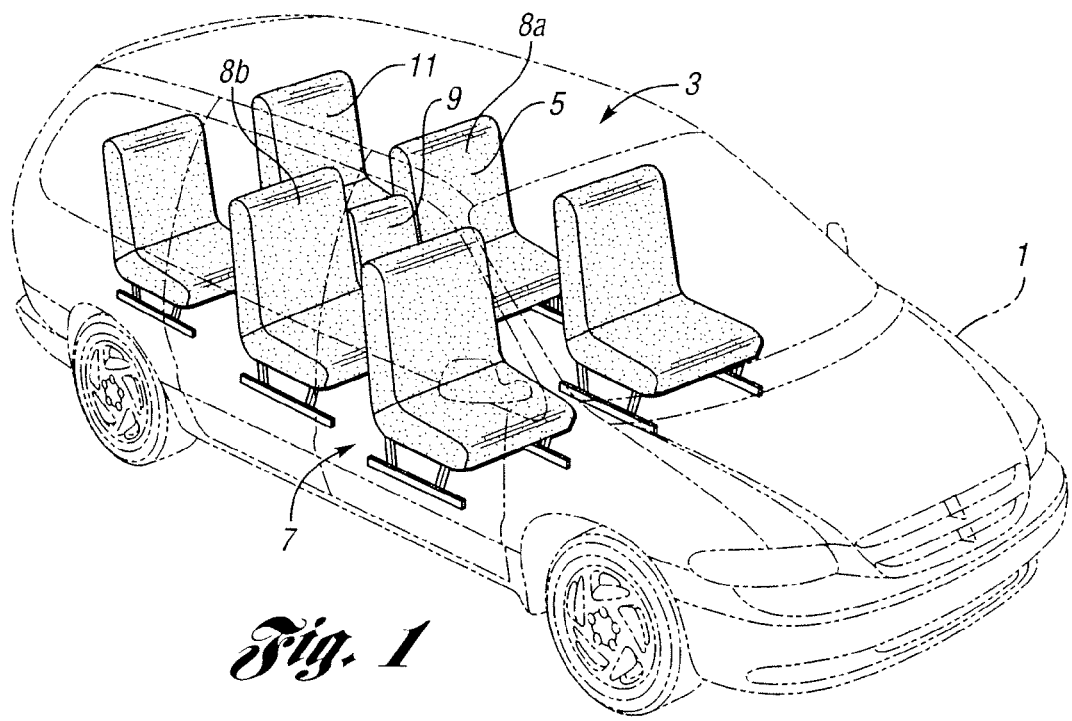
FIG. 1 is a perspective view illustrating an exemplary vehicle having a second row of seats and a center seat.

FIG. 1 illustrates a non-limiting example of a vehicle 1 having an interior compartment 3. Within the interior compartment 3 is a second row of passenger seats 5 attached to a vehicle floor 7. In the illustrated embodiment, the second row of seats 5 include outboard seats 8a and 8b and a center seat 9 adjacent each of the seats 8a and 8b. When in the deployed position, the center seat 9 which is a non-limiting example of a vehicular component, blocks or hinders passenger access to a third row of passenger seats 11.

Figure 2:
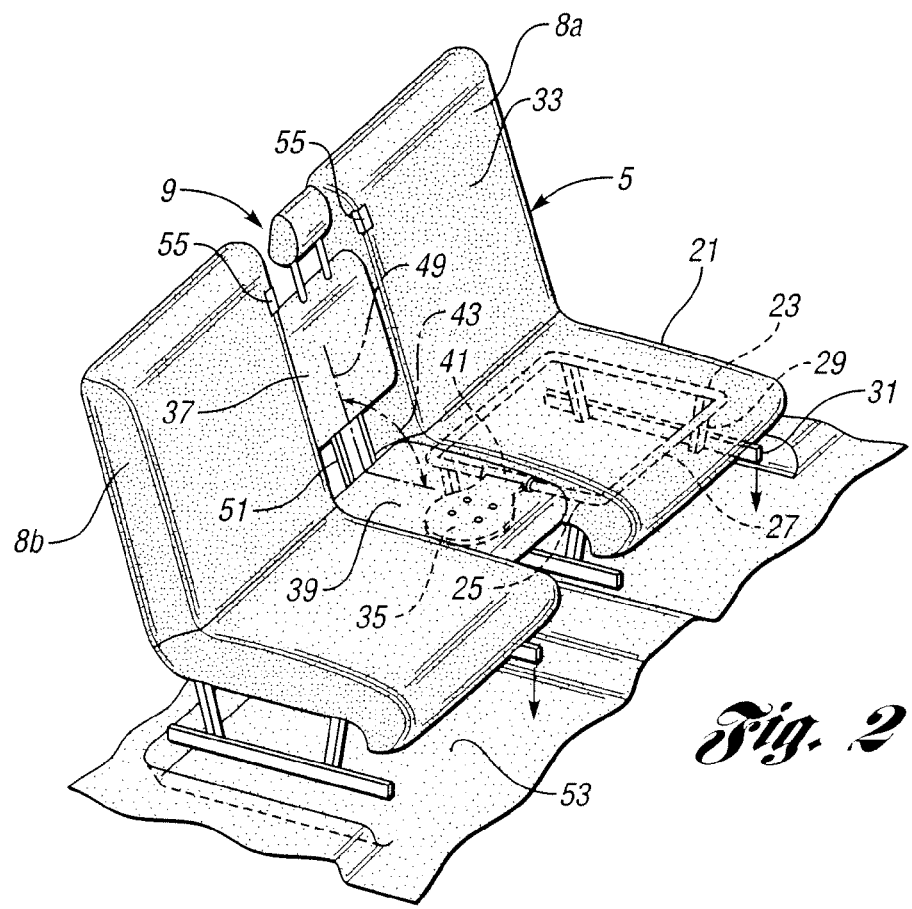
FIG. 2 is a fragmentary perspective view of a second row of seats with a center seat according to an embodiment of the invention.

Referring to FIG. 2, the second row of passenger seats 5 is illustrated in a non-limiting embodiment. In this embodiment, the center seat 9 is stowable within the outboard seat 8a. While embodiments of the invention will be described below with reference to seat 8a as the seat 8a into which the center seat 9 is stowable; it should be understood that outboard seat 8b could alternatively or additionally be adapted to stow the center seat 9. The outboard seat 8a is comprised of a movable cushion 21. A seat back 33 is positioned upright at a rear end of the movable cushion 21. The movable cushion 21 is adjacent to a subframe 23. The subframe 23 is comprised in this illustration of an embodiment of a longitudinal bar 25 and a transverse bar 27. The subframe 23 is supported by one or more of a plurality of legs 29 that are attached to a rail 31. The rail 31 is secured to the vehicle floor 7. The floor 7 may also include a depression 53 underlying the movable cushion 21 and one or more legs 29. The longitudinal bar 25 and the transverse bar 27 define a portion of a periphery that defines an opening underlying the movable cushion 21.

The rail 31 is secured to the vehicle floor 7. It should be understood that the leg 29 could optionally be secured to the vehicle floor 7 or an intermediate layer that is secured to the vehicle floor 7 without violating the spirit of this invention. The outer seats 8a and 8b in this embodiment each have a latch 55 adjacent to the seat back 33.

In this non-limiting embodiment, on the longitudinal bar 25 is a pivot arm 35 that is attached to a foldable center seat base 39. The center seat base 39 is adjacent to a foldable center seat back 37. The center seat back 37 fits in a gap between the two outer seats 8a and 8b of the second row seats 5. The center seat back 37 comprises a back frame 49 placed on a slider mechanism 51 in this embodiment.

In this embodiment, the pivot arm 35 is connected at one end to a rotary sleeve 41. The rotary sleeve 41 is connected to the longitudinal bar 25 of the subframe 23. It should be understood that the pivot arm 35 may optionally be articulated to allow stowage of the center seat 9 or any vehicular component at additional orientations. It should be further understood that there may optionally be a trigger to remotely allow the beginning of the stowage operation of the center seat 9. A non-limiting example of a trigger may be a Bowden cable.

It should be understood that the folded center seat may slide in differing amounts because the seat back 33 and the movable cushion 21 of the outer seat 8a may be adapted to move on a series of opposed tracks in order to provide a gap for an occupant's legs or other objects placed on and/or adjacent to the third row seats 11.

The gap between outer seats 8a and 8b into which the center seat 9 is positioned may have a range of width which may selected independently from greater than 50 mm, greater than 100, greater than 150 mm, greater than 200 mm, or greater than 225 mm and less than 1000 mm, less than 500 mm, less than 400 mm, less than 300 mm, or less than 275 mm. It should be understood that the proportions of widths of the center seat 37 and the outer seats 8a and 8b of the second row seats 5 may be varied within the overall width of the vehicle 1.

In this illustrated embodiment, the foldable seat back 37 is shortened relative to the back frame 49 and placed on the slider mechanism 51 on which it is adapted to slide. The back frame 49 on the slider mechanism 51 allows the foldable seat back 37 to be positioned so as to not interfere with the seat back 33 when the center seat is rotated laterally and upward during stowage under the movable cushion 21. The back frame 49, folded seat back 37, and the folded center seat 9 may slide a range of distance selected independently from greater than 25 mm, greater than 35 mm, greater than 40 mm, or greater than 50 mm to less than 300 mm, less than 200 mm, less than 150 mm, less than 125 mm, less than 100 mm, or less than 75 mm. It should be understood that other mechanisms for translational movement may also be used without violating the spirit of this invention. Non-limiting examples of translational movement mechanisms may include a worm gear, a screw drive, a bar with detents, or a rack-and-pinion gear.

In this illustration of an embodiment of the invention, the foldable seat in the gap is in a deployed position where the angle 43 of the center seat back to the center seat base is greater than 45 degrees.

Figure 3:
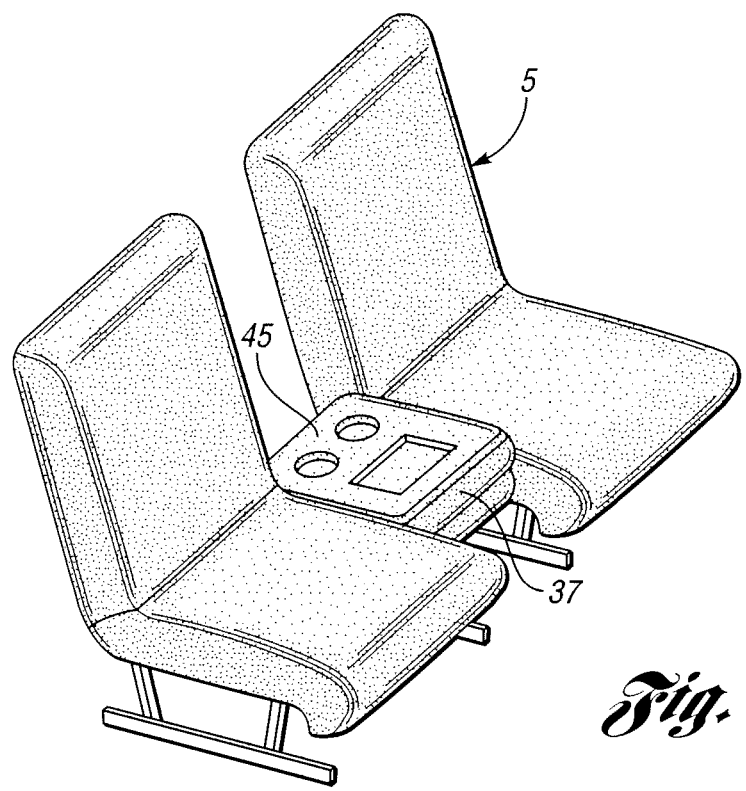
FIG. 3 illustrates an alternative aspect of the center seat according to an embodiment of the invention.

FIG. 3 illustrates an embodiment of this invention where the foldable seat back 37 comprises a service tray 45 positioned on the rearward side of the foldable seat back 37. The seat back 37 has been folded down revealing the service tray 45. It should be understood that the service tray 45 represents a typical consumer amenity found in vehicles. The service tray 45 may optionally also open out when the center seat back 37 is upright and deployed so that the occupants of the third row seats 11 may use the tray amenities. It should be understood that other amenities may be included without violating the spirit of this invention. Non-limiting examples of the amenities include an electronics housing, a storage compartment, a mobile office desk, or a game board. Positioning the service tray 45 on the slider mechanism 51 (FIG. 2) makes the adjustment of the position of the service tray more convenient for the passengers of the second row of seats.

Figure 4:
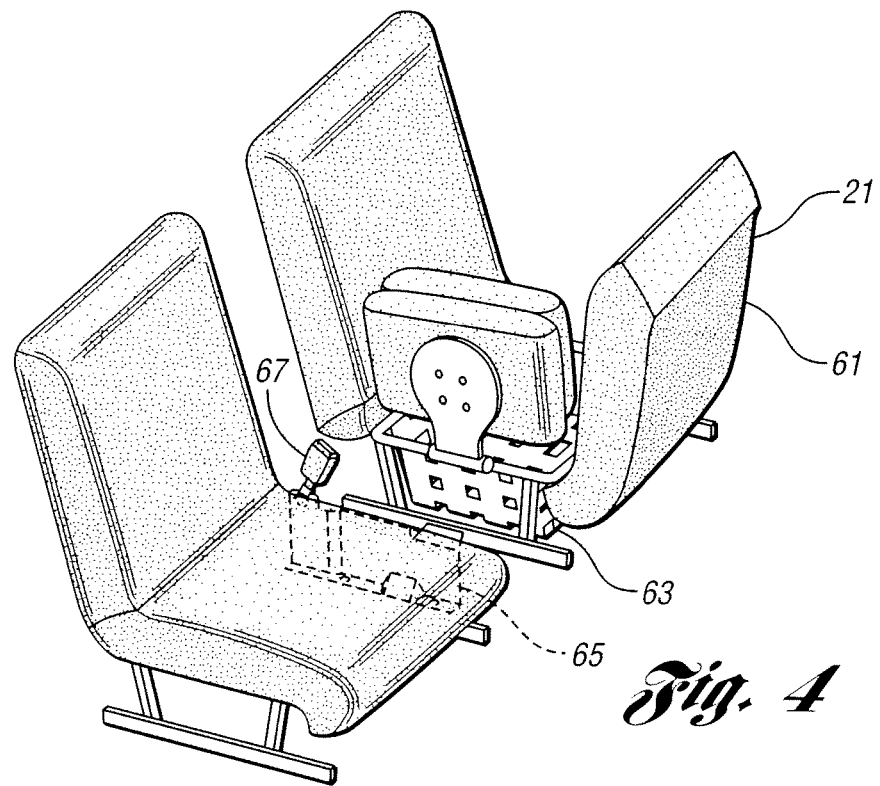
FIG. 4 illustrates a portion of the stowage operation of the center seat according to an embodiment of the invention.

FIG. 4 illustrates an embodiment of this invention where the outer seat 8a includes a basket 63. In this embodiment, the movable seat cushion 21 is deployed to an open position 61 exposing the subframe 23 and the opening beneath the subframe 23. As an option in this embodiment, the stowable center seat 9 is rotated approximately 180 degrees transversely to the axis of the longitudinal bar 25 so that the center seat 9 fits into the opening exposed when the movable cushion 21 is deployed to the open position 61. This rotation opens the passageway between the second row of seats 5 and the third row of seats 11.

An additional aspect illustrated in this embodiment is a center seat belt anchor panel 65 which is secured to the vehicle floor 7 and is adjacent to outer seat 8b. This positioning does not hinder access to the third row of seats 11 when the center seat 9 is stowed. It should be understood that the panel may be positioned adjacent either outer seat 8a or 8b. Attached to the anchor panel 65 is a seat belt buckle 67 for use by the center seat occupant. The buckle 67 is accessible for all positionings of the outer seats 8a and 8b, as well as the center seat 9. It should be understood further that positioning of the buckle 67 and the plate 65 may be further constrained by regulatory requirements.

It should be understood that common tooling may assist in reducing costs of manufacture of the outer seats 8a and 8b if both outer seats 8a are adapted to have a rotatable moveable cushion 21.

Figure 5:
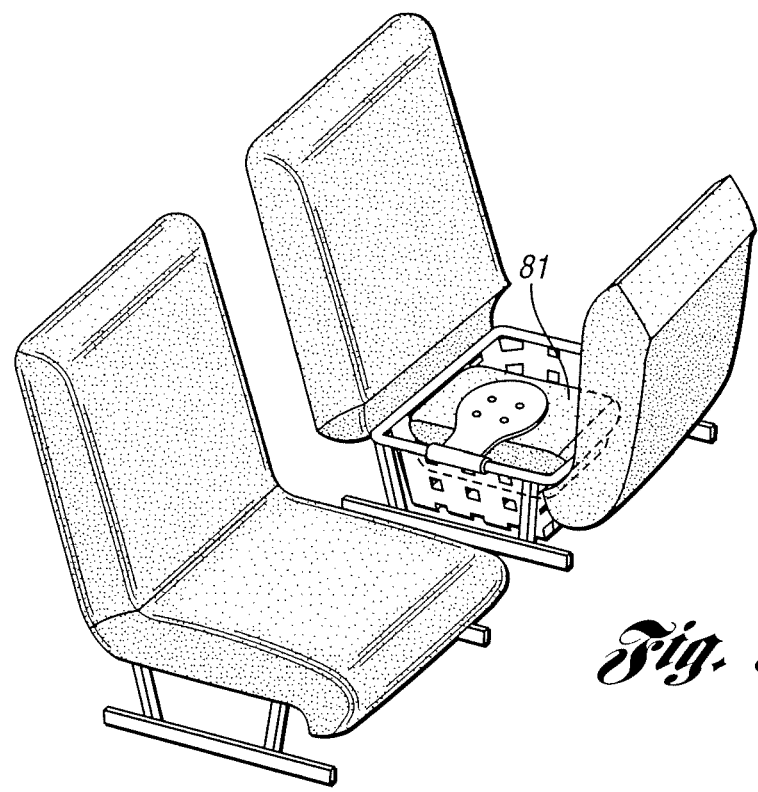
FIG. 5 illustrates another portion of the center seat stowage operation according to an embodiment of the invention.

In the illustration of an embodiment of the invention in FIG. 5, the folded center seat 9 is stowed through the opening into the space underneath the second row of seats 5. The pivot arm 35 is attached to the bottom side 81 of the center seat base 39.

Figure 6:
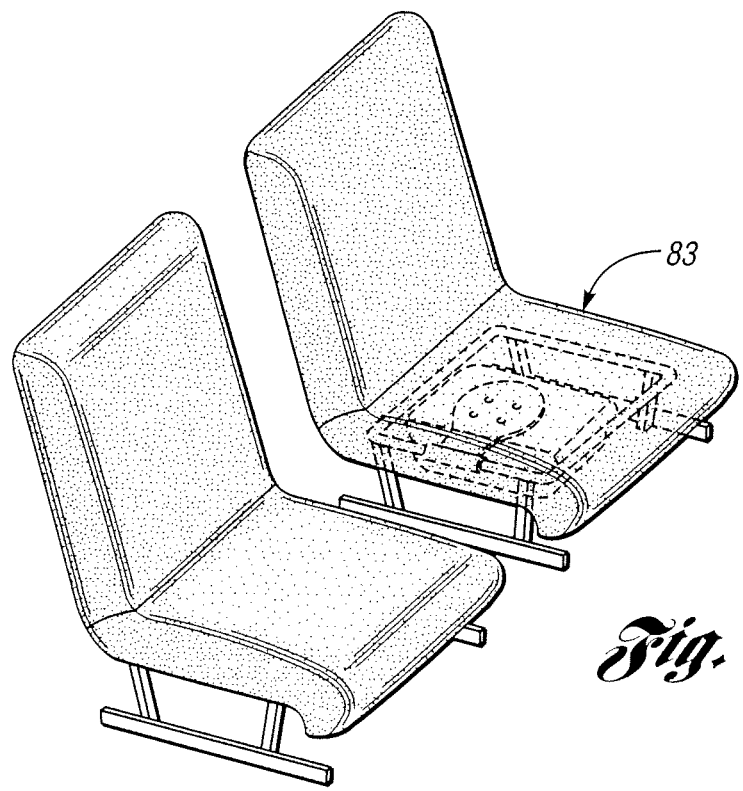
FIG. 6 illustrates a configuration of the seats where the center seat is stowed according to an embodiment of the invention.

The illustration of an embodiment of the invention where the movable seat cushion 21 has been moved to a closed position 83, effectively hiding the stowable center seat beneath the movable cushion 21, is shown in FIG. 6.

According to one embodiment of this invention, to stow the stowable center seat 9 from the deployed position to an intermediate position, and finally to a stowed position, push the latch 55 on the seat back 37 which allows the center seat back 37 to be folded down so that it is adjacent to the seat base 39. In this intermediate position, an optional service tray 45 may be exposed to second seat passengers to hold refreshments, video games, compact disks, and other items routinely carried during travel.

To begin the stowing operation for the center seat in at least one embodiment the moveable cushion 21 is rotated forward, the seat back 37 and base 39 may then be slid using a rotary sleeve 41, attached to the seat back 39 by the pivot arm 35, along the longitudinal bar 25 of the subframe 23 of the outer seat 8a. The longitudinal bar 25 may be positioned at a range of height from the vehicle floor 7 beneath the center seat 9 which may be selected independently from greater than 100 mm, greater than 200 mm, or greater than 250 mm and lower than 600 mm, less than 500 mm, less than 400 mm, less than 300 mm, or less than 275 mm. When the back 37 and base 39 have moved forward so that they can pass by the seat back 33 of the outer seat 8a in the second row of seats 5, the stowable center seat 9 is pivoted up and toward the outer seat 8a. The stowable center seat 9 continues to rotate until the seat bottom side 81 is facing upward towards the vehicle roof and is at or below the level of the longitudinal bar 25. The appropriate level may be determined by the ability to close the moveable cushion 21 by rotating the cushion 21 backwards toward the rear of the vehicle 1.

The center seat 9, when in the stowed position, according to this embodiment underlies a portion of the moveable cushion 21. The stowed center seat 9 may be positioned in the depression 53 in the floor 7 of the vehicle 1. The depression may have a depth selected from a range independently selected from greater than 1 mm, greater than 10 mm, greater than 25 mm, greater than 40 mm, or greater than 55 mm, and less than 200 mm, less than 100 mm, less than 80 mm, or less than 60 mm. In this same depression 53, or at least underlying a portion of the moveable cushion 21 may be an optional basket 63 or other container adapted to hold additional items used when traveling. The basket 63 may also be selectably removable, for a non-limiting example, when the center seat 9 is stowed.

The center seat 9 when stowed may be positioned selectably at a range of height above the vehicle floor 7 underneath the moveable cushion which may be selected independently from greater than 0 mm, greater than 10 mm, or greater than 19 mm and less than 100 mm, less than 75 mm, less than 50 mm, less than 40 mm, or less than 25 mm.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A stowable seat assembly for use with a vehicle, the assembly comprising:
   a first seat having a first seat back and a movable first seat base, the first seat further including a longitudinal bar, the longitudinal bar defining at least in part an opening and a cavity underlying the first seat base;
   a second seat adjacent to the first seat having a second seat base with a bottom side and a movable second seat back capable of being folded adjacent to the seat base; and
   a pivot arm having a first end connected to the bottom side of the second seat base and a second end connected to the longitudinal bar of the first seat, wherein the pivot arm is adapted to be positionable on the longitudinal bar to allow the second seat, when folded, to pivot into the cavity to stow the second seat within the cavity, wherein the pivot arm slidingly engages the longitudinal bar.

2. The stowable seat assembly of claim 1, further comprising a subframe, the subframe comprising the longitudinal bar and a lateral bar horizontally transverse to the longitudinal bar, the movable first seat base being connected to the subframe to rotate in a first direction to an open position wherein the first seat base extends generally upward from the lateral bar, and to rotate in a second direction, opposite the first direction, to a closed position wherein the first seat base extends generally over the lateral bar.

3. The stowable seat assembly of claim 2, wherein the vehicle, with which the assembly is usable, comprises a floor having a vertical depression for underlying the opening, the assembly being securable to the floor, the depression being depressed relative to an area of the floor underlying the second seat when deployed, wherein the subframe is securable to the floor by at least one downstanding leg, the leg, the depression, and the opening defining a portion of the cavity into which the second seat is stowed.

4. The stowable seat assembly of claim 3, wherein the depression in the floor is depressed 1-100 mm.

5. The stowable seat assembly of claim 1, wherein the movable second seat back is supported on a rotatable frame.

6. The stowable seat assembly of claim 5, wherein the second seat back is shorter than the rotatable frame, the second seat back moving coaxially along the rotatable frame to cooperate with the second seat base, when folded, to pass by the first seat back during stowing of the second seat.

7. The stowable seat assembly of claim 6, wherein the second seat back is slidingly movable along the rotatable frame.

8. The stowable seat assembly of claim 1, wherein the pivot arm is slidable a length of 25-300 mm along the longitudinal bar.

9. The stowable seat assembly of claim 1, further comprising a basket positioned in the cavity.

10. A stowable seat assembly for use with a vehicle having a first row of seats and a second row of seats, the assembly comprising:
    a first seat having a first bar defining a portion of a periphery of an opening underlying the seat;
    a pivot arm having a first end connected to the first bar and a second end; and
    a second seat having a seat base connected to the second end of the pivot arm, a seat back connected to the seat base, the seat back including a rotational back frame adapted to fold down adjacent to the seat base, wherein when the second seat is secured to the vehicle within the first row of seats, and when the second seat is folded to an intermediate position and coaxially moved along the first bar until the seat can rotate about the first bar through the opening into the stowed position, the folded and coaxially moved second seat opens a passageway between a first row of passenger seats and a second row of passenger seats after pivoting of the pivot arm to stow the second seat.

11. The stowable assembly of claim 10, further comprising:
    a service tray adjacent to the seat back, the tray being selectively positionable when the seat back is upright in a deployed position for use by passengers in a third row of seats.

12. The stowable assembly of claim 10, further comprising, a subframe for the first seat having a second bar; and
    a movable seat cushion overlying the subframe, the movable cushion being rotatable forward to expose the opening underlying the first seat when the second seat is the pivoted from the intermediate position to the stowed position, the movable cushion being rotated backward to cover the opening and to be positioned adjacent to the subframe in closed position when the second seat is in the stowed position.

13. The stowable assembly of claim 10, further comprising:
   a sleeve forming the first end of the pivot arm, the sleeve capable of slidingly engaging the first bar and capable of rotationally engaging the first bar, and
   a Bowden cable adjacent to the first seat capable, when pulled, of releasing the sleeve to slide along the first bar.

14. A method for stowing a vehicular component cooperable for stowing with an outer seat having a movable seat cushion in a row of seats in a vehicle, the method comprising:
   rotating the movable seat cushion of the outer seat to expose an opening underlying a portion of the movable cushion, the opening being adapted to receive the vehicular component;
   sliding the vehicular component in a first direction along a longitudinal bar of a subframe of the outer seat until the vehicular component is capable of passing by a seat back of the outer seat when the vehicular component is pivoted laterally to the longitudinal bar;
   pivoting the vehicular component up and into the opening in the outer seat, the vehicular component being at or below a height level of the longitudinal bar when pivoting is completed, wherein pivoting the vehicular component laterally to the longitudinal bar approximately 180 degrees opens a passageway between the row of seats and an area behind the row of seats; and
   rotating the movable cushion backwards toward the rear of the vehicle until the outer seat achieves a closed position and the vehicular component is stowed.

15. The method of claim 14, wherein the sliding step of the vehicular component is triggered by pulling a Bowden cable.

16. The method of claim 14, wherein the movable cushion of the outer seat is selectably positioned along a track and is independent of the position of the vehicular component.

17. The method of claim 16, wherein the vehicular component slides 25-300 mm to accommodate the location of the movable cushion.

18. The method of claim 14, wherein the vehicular component is a stowable center seat.

19. The method of claim 18, further comprising:
   folding a seat back of the stowable center seat from the deployed position to an intermediate position adjacent to a seat base forming a folded center seat exposing a service tray.

20. A stowable seat assembly for use with a vehicle, the assembly comprising:
   a first seat having a first seat back and a movable first seat base, the first seat further including a longitudinal bar, the longitudinal bar defining at least in part an opening and a cavity underlying the first seat base;
   a second seat adjacent to the first seat having a second seat base with a bottom side and a movable second seat back capable of being folded adjacent to the seat base; and
   a pivot arm having a first end connected to the bottom side of the second seat base and a second end connected to the longitudinal bar of the first seat, wherein the pivot arm is adapted to be positionable on the longitudinal bar to allow the second seat, when folded, to pivot into the cavity to stow the second seat within the cavity, the second seat back is supported on a rotatable frame, the second seat back moving coaxially along the rotatable frame to cooperate with the second seat base, when folded, to pass by the first seat back during stowing of the second seat.

21. The stowable seat assembly of claim 20, wherein the pivot arm slidingly engages the longitudinal bar.

22. The stowable seat assembly of claim 20, wherein the second seat back is shorter than the rotatable frame.

23. A stowable seat assembly for use with a longitudinal bar in a vehicle, the assembly comprising:
   a supplemental seat with a seat base having a bottom side and a movable seat back capable of being folded adjacent to the seat base; and
   a pivot arm having a first end connected to the bottom side of the supplemental seat base and a second end connected to a longitudinal bar, wherein the pivot arm is adapted to slidingly engage the longitudinal bar to allow the supplemental seat, when folded, to pivot sufficiently to be capable of having the seat base bottom side move from facing downward to facing upward, the supplemental seat back moving coaxially along the rotatable frame to cooperate with the supplemental seat base, when folded, to slide along the longitudinal bar sufficiently to allow pivoting of the folded supplemental seat.

24. A stowable seat assembly of claim 23, wherein the supplemental seat back is movable and is supported on a rotatable frame, the seat back being shorter than the rotatable frame.

25. A stowable seat assembly of claim 23, wherein the supplemental seat back, when folded from a deployed position to an intermediate position proximate to the supplemental seat base, exposes a service tray.

26. A stowable seat assembly of claim 23, further comprising:
   a sleeve forming the first end of the pivot arm, the sleeve capable of slidingly engaging the longitudinal bar and capable of rotationally engaging the longitudinal bar; and
   a Bowden cable adjacent to the passenger seat capable of releasing the sleeve to slide along the first bar when the passenger seat is folded.

* * * * *